United States Patent
Suh et al.

(10) Patent No.: US 8,284,726 B2
(45) Date of Patent: Oct. 9, 2012

(54) APPARATUS AND METHOD FOR ALLOCATING RESOURCE IN A WIRELESS COMMUNICATION SYSTEM USING OFDMA

(75) Inventors: Sung-jin Suh, Seoul (KR); Sung-jun Yoon, Seoul (KR); Myung-cheul Jung, Seoul (KR)

(73) Assignee: Pantech Co., Ltd., Seoul (KR)

( * ) Notice: Subject to any disclaimer, the term of this patent is extended or adjusted under 35 U.S.C. 154(b) by 329 days.

(21) Appl. No.: 12/608,561

(22) Filed: Oct. 29, 2009

(65) Prior Publication Data

US 2010/0103897 A1  Apr. 29, 2010

(30) Foreign Application Priority Data

Oct. 29, 2008  (KR) .......................... 10-2008-0106492
Nov. 25, 2008  (KR) .......................... 10-2008-0117471

(51) Int. Cl.
  *H04W 4/00*  (2009.01)
(52) U.S. Cl. ......... 370/329; 370/342; 370/344; 370/348
(58) Field of Classification Search .................. 370/329, 370/335, 344, 348; 375/132, 260, 362; 455/67.11
  See application file for complete search history.

(56) References Cited

U.S. PATENT DOCUMENTS

| | | | |
|---|---|---|---|
| 2002/0176385 A1* | 11/2002 | Huh et al. | 370/335 |
| 2006/0188004 A1* | 8/2006 | Kizu et al. | 375/132 |
| 2007/0026810 A1* | 2/2007 | Love et al. | 455/67.11 |
| 2008/0137764 A1* | 6/2008 | Kim et al. | 375/260 |
| 2008/0266098 A1* | 10/2008 | Aiouaz et al. | 340/572.1 |
| 2009/0116599 A1* | 5/2009 | McCoy | 375/362 |

\* cited by examiner

*Primary Examiner* — Hassan Kizou
*Assistant Examiner* — Toan Nguyen
(74) *Attorney, Agent, or Firm* — H.C. Park & Associates, PLC (57) ABSTRACT

An apparatus for allocating a resource in a wireless communication system using an orthogonal frequency division multiple access (OFDMA) scheme includes an analysis unit to analyze a signal received from a terminal over a channel to determine characteristics of the channel; an allocation unit to allocate a first frequency band to the terminal based on the characteristics of the channel; and a frequency hopping unit to perform frequency hopping from the first frequency band to a second frequency band after a first time period. A method for allocating the resource in an OFDMA wireless communication system includes analyzing a signal received from a terminal over a channel to determine characteristics of the channel, allocating a first frequency band to the terminal based on the characteristics of the channel, and performing frequency hopping from the first frequency band to a second frequency band after the first time period.

21 Claims, 10 Drawing Sheets

TERMINAL 1

Best frequency band :
C band = 0x11
D band = 0x12
R band = 0x1a
S band = 0x1f
T band = 0x22
U band = 0x2a Good frequency band :
A band = 0x08
B band = 0x09
E band = 0x14
F band = 0x15
O band = 0x17
P band = 0x18
Q band = 0x19
V band = 0x2d

APPARATUS AND METHOD FOR ALLOCATING RESOURCE IN A WIRELESS COMMUNICATION SYSTEM USING OFDMA

CROSS-REFERENCE TO RELATED APPLICATIONS

This application claims priority from and the benefit of Korean Patent Application No. 10-2008-0106492 filed on Oct. 29, 2008 and Korean Patent Application No. 10-2008-0117471 filed on Nov. 25, 2008, which are hereby incorporated by reference for all purposes as if fully set forth herein.

BACKGROUND OF THE INVENTION

1. Field of the Invention

The present invention relates to an apparatus and method for allocating a resource in a wireless communication system employing an orthogonal frequency division multiple access (OFDMA) scheme.

2. Discussion of the Background

In recent years, orthogonal frequency division multiplexing (OFDM) or orthogonal frequency division multiple access (OFDMA) has been used as a scheme for high-speed data transmission over a wired/wireless channel. The OFDM or OFDMA scheme refers to a data transmission scheme using a multi-carrier, in which serially input data is converted into parallel signals, the respective converted signals are modulated with mutually orthogonal sub-carriers, that is, sub-channels, and then the modulated signals are transmitted.

This OFDMA scheme can achieve improved transmission efficiency at high-speed data transmission by transmitting data while maintaining orthogonality between multiple sub-carriers. It is also characterized by good frequency efficiency and resistance to multi-path fading.

In addition, the OFDMA scheme is advantageous in that it is resistant to frequency-selective fading due to the use of an overlapped frequency spectrum, it can reduce the effect of inter-symbol interference (ISI) by using a guard interval, it makes it possible to more simply design an equalizer structure in hardware, and it is resistant to impulsive noise.

In a wireless communication system using the OFDMA scheme (hereinafter referred to as "OFDMA wireless communication system"), frequency-selective scheduling can be used to continuously allocate frequency resources with good channel conditions to one user. However, as frequency bands allocated to users gradually broaden, there are limitations in continuously allocating frequency resources with good channel conditions to one user in the OFDMA wireless communication system.

SUMMARY OF THE INVENTION

Exemplary embodiments of the present invention provide a resource allocation scheme that combines frequency-selective scheduling with a frequency hopping scheme based on channel characteristics.

Exemplary embodiments of the present invention provide frequency-selective scheduling gain by continuing to allocate frequency bands to a terminal by a base station, and provide frequency diversity gain by frequency hopping for randomizing interference with a terminal in a neighboring cell.

Additional features of the invention will be set forth in the description which follows, and in part will be apparent from the description, or may be learned by practice of the invention.

An exemplary embodiment of the present invention discloses an apparatus for allocating a resource in a wireless communication system using an orthogonal frequency division multiple access (OFDMA) scheme, the apparatus including an analysis unit to analyze a signal received from a terminal over a channel to determine characteristics of the channel; an allocation unit to allocate a first frequency band to the terminal based on the determined characteristics of the channel; and a frequency hopping unit to perform frequency hopping from the first frequency band to a second frequency band after a first time period.

An exemplary embodiment of the present invention discloses a method for allocating a resource in a wireless communication system using an orthogonal frequency division multiple access (OFDMA) scheme, the method including analyzing a signal received from a terminal over a channel to determine characteristics of the channel; allocating a first frequency band to the terminal based on the determined characteristics of the channel; and performing frequency hopping from the first frequency band to a second frequency band after a first time is period.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE EMBODIMENTS

Hereinafter, exemplary embodiments of the present invention will be described with reference to the accompanying drawings. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1:
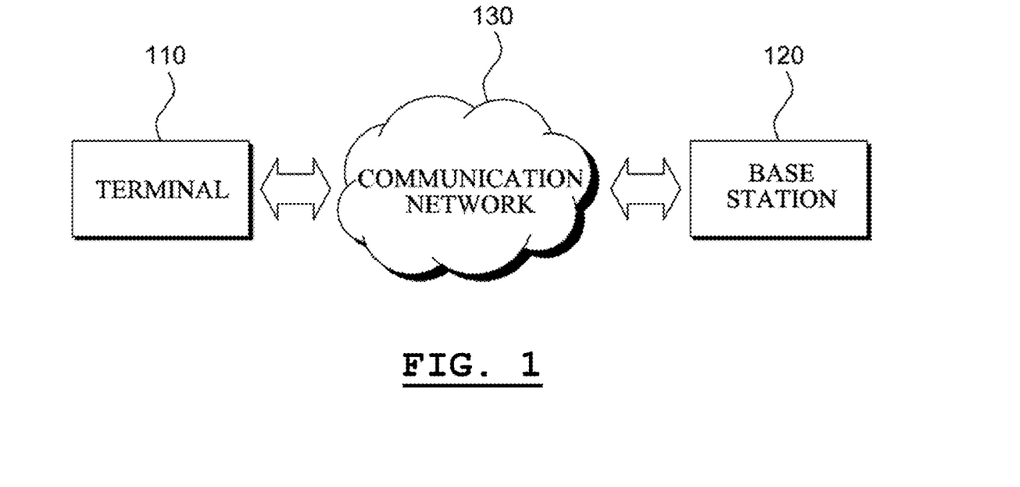
FIG. 1 illustrates a network structure of an OFDMA wireless communication system in accordance with an exemplary embodiment of the present invention.

FIG. 1 illustrates a network structure of an OFDMA wireless communication system according to an exemplary embodiment of the present invention.

Referring to FIG. 1, a terminal 110 transmits a signal including a channel-sounding reference signal (CSRS) to a base station 120 over a communication network 130. Here, the CSRS refers to a reference signal that is transmitted from a terminal 110 over all frequency bands, including frequency bands allocated to the terminal 110, to inform the base station 120 of the characteristics of a channel between the terminal 110 and the base station 120.

The base station 120 analyzes the CSRS received from the terminal 110 to recognize the characteristics of a channel between the terminal 110 and the base station 120. The base station 120 selects a first frequency band according to the recognized channel characteristics and allocates it to the terminal 110 through frequency-selective scheduling. The first frequency first frequency band may be the best frequency band, or the frequency band having the best recognized characteristics among the frequency bands over which the CSRS is transmitted and available for allocation.

In the conventional scheme of resource allocation, the base station 120 allocates the first frequency band selected by frequency-selective scheduling to the terminal 110 until the channel characteristics of the allocated frequency band deteriorate. In this case, frequency-selective scheduling gain may be obtained, but frequency diversity gain obtainable by frequency hopping may not be obtained in the conventional scheme. Also, in the conventional scheme, if a resource unit (RU) allocated to a second terminal (not shown) in a second cell neighboring the cell associated with the base station 120 is the same as that allocated to a terminal 110 in the cell associated with the base station 120, the terminal 110 in the corresponding cell may be continually interfered by the second terminal in the neighboring second cell while the RU is the same.

Accordingly, according to the exemplary embodiment of the present invention, is the base station 120 performs frequency hopping from the first frequency band selected by frequency-selective scheduling to a different frequency band at certain time periods. With regard to this, the base station 120 does not randomly perform frequency hopping as in a high-speed mobile communication environment, but performs frequency hopping in consideration of the channel characteristics between terminals.

For example, assuming that the best frequency band for terminal 110 is frequency band A, terminal 110 may also have good channel characteristics in frequency bands B and C. In this case, the base station 120 makes a list of frequency bands A, B, and C. Also, the base station 120 first allocates frequency band A to terminal 110 by making reference to the list. With regard to this, the base station 120 does not continue to allocate frequency band A to terminal 110 until the channel characteristics of frequency band A deteriorate, but randomly selects frequency band B or C, and performs frequency hopping to the selected frequency band B or C. The base station 120 may select a frequency band having the lowest channel correlation property with frequency band A from among frequency bands B and C, and perform frequency hopping to the selected frequency band.

In exemplary embodiments of the present invention, frequency-selective scheduling gain can be obtained by using the scheme as mentioned above to continue to allocate frequency bands with good channel characteristics to a terminal 110, and at the same time frequency diversity gain can also be obtained by frequency hopping for randomizing interference with a terminal in a neighboring cell, which uses the same frequency band.

For reference, the terminal 110 may include any one of a mobile communication terminal and a fixed communication terminal, such as a desktop PC (personal computer). The mobile communication terminal may include a portable device into which a communication is function can be incorporated, such as a PDC (personal digital cellular) phone, a PCS (personal communication service) phone, a PHS (personal handyphone system) phone, a GSM (global standard for mobile) phone, an MBS (mobile broadband system) phone, a DMB (digital multimedia broadcasting) phone, a smart phone, and a cellular phone.

The mobile communication terminal may also include any type of handheld-based wireless communication apparatus including a portable terminal, such as a PSTN (public switched telephone network) terminal, a VoIP (voice over Internet protocol) terminal, an SIP (session initiation protocol) terminal, an MGCP (media gateway control protocol) terminal, an MEGACO (media gateway control) terminal, a PDA (personal digital assistant), a handheld PC, a notebook computer, a laptop computer, a WiBro (wireless broadband Internet) terminal, an MP3 player, and an mini-disk (MD) player; and an IMT-2000 (international mobile telecommunication-2000) terminal and a UMTS (universal mobile telecommunication service)-based terminal, which provide an international roaming service and extended mobile communication services.

A portable electric/electronic apparatus, such as the above-mentioned portable devices and handheld-based wireless communication apparatuses, may be a terminal that may include any communication module, such as a CDMA (code division multiplexing access) module, a Bluetooth module, an IrDA (infrared data association) module, a wired/wireless LAN card, and a wireless communication device with a GPS (global positioning system) chip for enabling position determination via a GPS, and can perform a certain calculation operation by being provided with a microprocessor. The portable electric/electronic apparatus may be capable of performing a multimedia playback function.

Reference will now be made in detail to a structure of a resource allocation is apparatus in an OFDMA wireless communication system according to an exemplary embodiment of the present invention.

Figure 2:
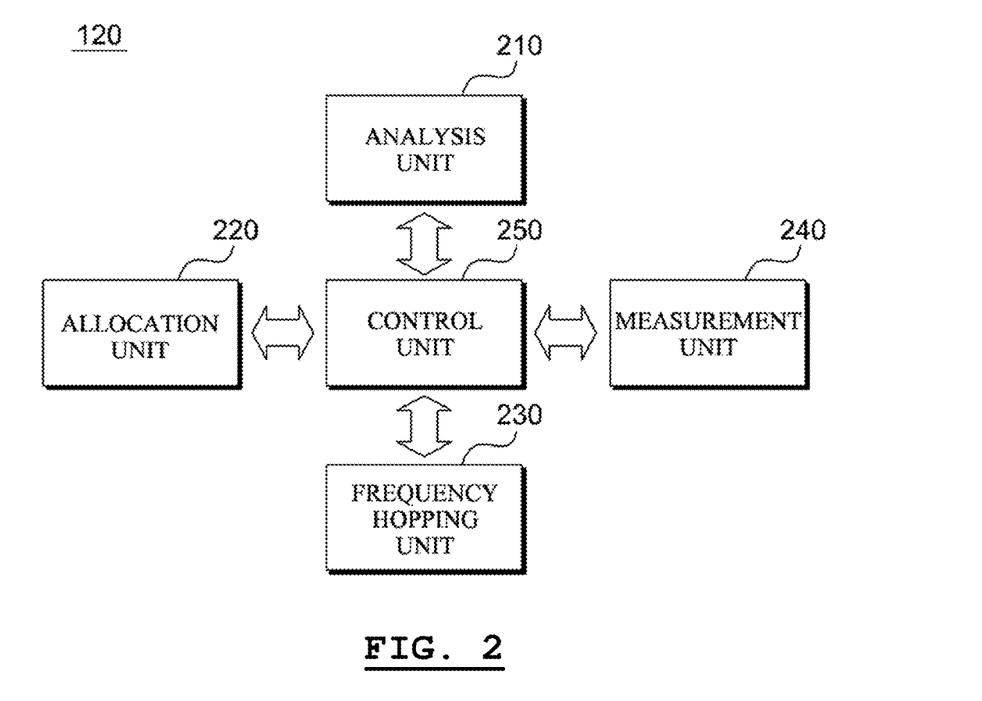
FIG. 2 is a block diagram of a resource allocation apparatus in an OFDMA wireless communication system in accordance with an exemplary embodiment of the present invention.

FIG. 2 is a block diagram of a resource allocation apparatus in an OFDMA wireless communication system according to an exemplary embodiment of the present invention. The resource allocation apparatus in an OFDMA wireless communication system according to this embodiment of the present invention may be implemented in the base station 120 of FIG. 1.

Referring to FIGS. 1 and 2, the resource allocation apparatus in an OFDMA wireless communication system includes an analysis unit 210, an allocation unit 220, a frequency hopping unit 230, a measurement unit 240, and a control unit 250.

The analysis unit 210 receives a signal from the terminal 110 via the communication network 130. More specially, the analysis unit 210 receives a signal from the terminal 110 over a channel between the terminal 110 and the base station 120 via the communication network 130. Here, the signal may include a channel-sounding reference signal (CSRS).

As mentioned above, the CSRS is a reference signal that is transmitted from the terminal 110 over all frequency bands, including frequency bands allocated to the terminal 110, to inform the base station 120 of the characteristics of a channel between the terminal 110 and the base station 120.

The analysis unit 210 analyzes the received signal to determine the characteristics of the channel. That is, the analysis unit 210 analyzes the CSRS, a type of reference signal, to determine the characteristics of the channel.

The allocation unit 220 allocates a first frequency band to the terminal 110 based on the determined characteristics of the channel. That is, the allocation unit 220 selects a is frequency band suitable for the determined characteristics of the channel as a first frequency band, and allocates the selected first frequency band to the terminal 110. With regard to this, the allocation unit 220 may select the first frequency band by using frequency-selective scheduling, and allocate the selected first frequency band to the terminal 110.

In this way, the allocation unit 220 can allocate a frequency band, which may have better determined characteristics of the channel, as the first frequency band to the terminal 110, thereby obtaining frequency-selective scheduling gain.

The frequency hopping unit 230 performs frequency hopping from the first frequency band to a different frequency band at certain time periods. For example, it is assumed that a frequency band, which is best for the determined characteristics of the channel and is first allocated to the terminal 110, is frequency band A, and frequency bands with good channel characteristics (but less than frequency band A) are frequency bands B and C. In this case, the frequency hopping unit 230 allocates frequency band B or C, instead of frequency band A, to the terminal 110 through frequency hopping when a certain period of time elapses after frequency band A is allocated to the terminal 110.

With regard to this, the frequency hopping unit 230 may perform frequency hopping in consideration of the correlation of each frequency band. That is, the frequency hopping unit 230 may select a second frequency band having the lowest channel correlation property with the first frequency band, and perform frequency hopping from the first frequency band to the second frequency band.

Alternatively, the frequency hopping unit 230 may perform frequency hopping in consideration of both the determined characteristics of the channel and the correlation of each frequency band. That is, the frequency hopping unit 230 may select a second frequency band is which has good channel characteristics and whose correlation with the first frequency band is lower than a predetermined criterion, and perform frequency hopping to the second frequency band.

Here, the predetermined criterion is a criterion for determining whether the correlation between channels is high or low. If any channel has a correlation lower than the criterion, then it can be determined that the path environment of the channel is different from that of any other channel. Also, the good channel characteristics refer to a case where the determined characteristics of the channel are equal to or greater than an appropriate reference value.

In this way, the frequency hopping unit 230 may perform frequency hopping in consideration of the characteristic of channel or the correlation of each frequency band, so that frequency diversity gain can be obtained by frequency hopping for randomizing interference to a terminal in a neighboring cell, which uses the same frequency band as the terminal 110. That is, when a frequency band allocated to the terminal 110 in a first cell is the same as that allocated to a second terminal in a second cell neighboring the first cell, the frequency hopping unit 230 can provide an environment in which the terminal 110 in the first cell is prevented from being continually interfered by the terminal in the second cell at certain time periods. Here, the correlation may be measured by the measurement unit 240.

The measurement unit 240 divides each sub-channel of the channel into regular time intervals, calculates the characteristic values of the channel corresponding to the divided time intervals, and measures the correlation of each sub-channel by using the calculated characteristic values. Accordingly, the frequency hopping unit 230 can perform frequency hopping based on the measured correlation of each sub-channel.

Alternatively, in consideration of the moving speed of the terminal 110, the is measurement unit 240 may divide a frequency band into multiple frequency bands, and measure the correlation for channels corresponding to the central frequencies of the respective divided frequency bands. Accordingly, the frequency hopping unit 230 can perform frequency hopping based on the measured correlation for channels corresponding to the central frequencies of the respective divided frequency bands.

The control unit 250 is responsible for the overall control of the resource allocation apparatus in an OFDMA wireless communication system. That is, the control unit 250 controls the overall operation of the analysis unit 210, the allocation unit 220, the frequency hopping unit 230, and the measurement unit 240.

Figure 3:
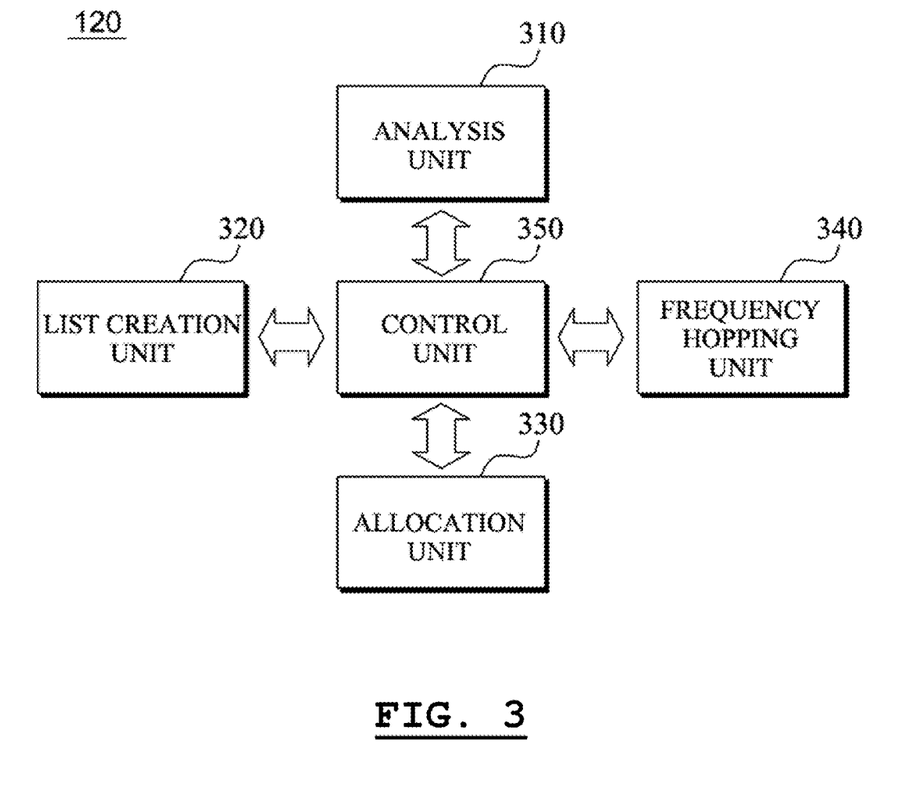
FIG. 3 is a block diagram for explaining a resource allocation apparatus in an OFDMA wireless communication system in accordance with another exemplary embodiment of the present invention.

FIG. 3 is a block diagram for explaining a resource allocation apparatus in an OFDMA wireless communication system according to another exemplary embodiment of the present invention. The resource allocation apparatus in an OFDMA wireless communication system according to this exemplary embodiment of the present invention may be implemented in the base station 120 of FIG. 1.

Referring to FIG. 1 and FIG. 3, the resource allocation apparatus in an OFDMA wireless communication system includes an analysis unit 310, a list creation unit 320, an allocation unit 330, a frequency hopping unit 340, and a control unit 350.

The analysis unit 310 receives a signal from the terminal 110 via the communication network 130. More specially, the analysis unit 310 receives a signal including a CSRS from the terminal 110 over a channel between the terminal 110 and the base station 120.

As mentioned above, the CSRS included in the received signal is a reference signal that is transmitted from the terminal 110 over all frequency bands, including frequency bands allocated to the terminal 110, to inform the base station 120 of the characteristics of a is channel between the terminal 110 and the base station 120.

The analysis unit 310 analyzes the CSRS to recognize the characteristics of the channel between the terminal 110 and the base station 120. That is, the analysis unit 310 can identify the best frequency bands, good frequency bands, and bad frequency bands in the channel between the terminal 110 and the base station 120 by analyzing the CSRS included in the received signal. For the purposes of this disclosure, "best frequency bands" shall refer to frequency bands having better channel characteristics, "bad frequency bands" shall refer to frequency bands having worse channel characteristics, and "good frequency bands" shall refer to frequency bands having channel characteristics that are worse than the best frequency bands but better than the bad frequency bands.

The list creation unit 320 creates a list of frequency bands where the recognized channel characteristics are equal to or greater than a predetermined reference value. That is, the list creation unit 320 makes a list of the best frequency bands and good frequency bands by using the recognized channel characteristics.

More specially, the list creation unit 320 performs frequency-selective scheduling to select frequency bands where the recognized channel characteristics are equal to or greater than a predetermined reference value. This may include the best frequency bands and good frequency bands. The list creation unit 320 then creates a list of the selected frequency bands. Here, the value of the reference value may consider the moving speed of the terminal 110 or the environment around the terminal 110.

The allocation unit 330 allocates a first frequency band to the terminal 110 by using the created list. That is, the allocation unit 330 selects a frequency band available for allocation and suitable for the recognized channel characteristics as a first frequency band from is among the best and good frequency bands within the created list, and allocates it to the terminal 110.

With regard to this, the allocation unit 330 may select the first frequency band from the list and then allocate it to the terminal 110 at a selected first period. Here, the first period corresponds to a period at which frequency-selective scheduling is performed, and the duration of which may be appropriately determined by the base station 120 according to the moving speed of the terminal 110 or the environment around the terminal 110.

The frequency hopping unit 340 performs frequency hopping from the first frequency band to a second frequency band by using the created list. With regard to this, the frequency hopping unit 340 may randomly select a second frequency band different from the first frequency band and then allocate it to the terminal 110 at a selected second period.

Here, the second period corresponds to a period at which frequency hopping is performed, and similar to the first period, may be appropriately determined by the base station 120 according to the moving speed of the terminal 110 or the environment around the terminal 110. With regard to this, the second period may be set shorter than the first period. In other words, the first period may be set longer than the second period. This is because a resource allocation scheme using frequency-selective scheduling exchanges appropriate messages between the terminal 110 and the base station 120, which may occupy certain time.

In this way, the frequency hopping unit 340 randomly allocates a resource through frequency hopping using the list at the second period so that frequency diversity gain can be obtained.

As another exemplary embodiment of the present invention, the frequency hopping unit 340 may perform frequency hopping in consideration of the correlation of each is frequency band. That is, the frequency hopping unit 340 may select a second frequency band having a lower correlation property with the first frequency band, and perform frequency hopping to the selected second frequency band.

Alternatively, the frequency hopping unit 340 may perform frequency hopping in consideration of both the recognized characteristics of the channel and the correlation of each frequency band. That is, the frequency hopping unit 340 may select a second frequency band which has good channel characteristics and whose correlation with the first frequency band is lower than a predetermined criterion, and perform frequency hopping to the selected second frequency band.

Here, the predetermined criterion may be a criterion for determining whether the correlation between channels is high or low. If any channel has a correlation lower than the criterion, then it can be determined that the path environment of the channel is different from that of another channel. Specifically, it can be determined that the channel has a path that is independent of another channel's path.

In this way, the frequency hopping unit 340 performs frequency hopping in consideration of the characteristics of a channel or the correlation of each frequency band, so that frequency diversity gain can be obtained by frequency hopping for randomizing interference to a terminal in a neighboring second cell, which uses the same frequency band as the terminal 110 in the first cell.

Here, the correlation may be measured by a correlation measurement unit (not illustrated). The correlation measurement unit divides each sub-channel of the channel between the terminal 110 and the base station 120 into regular time intervals, calculates the characteristic values of the channel corresponding to the divided time intervals, and measures the correlation of is each sub-channel by using the calculated characteristic values. Accordingly, the frequency hopping unit 340 can perform frequency hopping based on the measured correlation of each sub-channel.

Alternatively, in consideration of the moving speed of the terminal 110, the correlation measurement unit may divide a frequency band into multiple frequency bands, and may measure the correlation for channels corresponding to the central frequencies of the respective divided frequency bands. Accordingly, the frequency hopping unit 340 can perform frequency hopping based on the measured correlation for channels corresponding to the central frequencies of the respective divided frequency bands.

The control unit 350 is responsible for the overall control of the resource allocation apparatus in an OFDMA wireless communication system. That is, the control unit 350 controls the overall operation of the analysis unit 310, the list creation unit 320, the allocation unit 330, the frequency hopping unit 340, and the correlation measurement unit.

Figure 4:
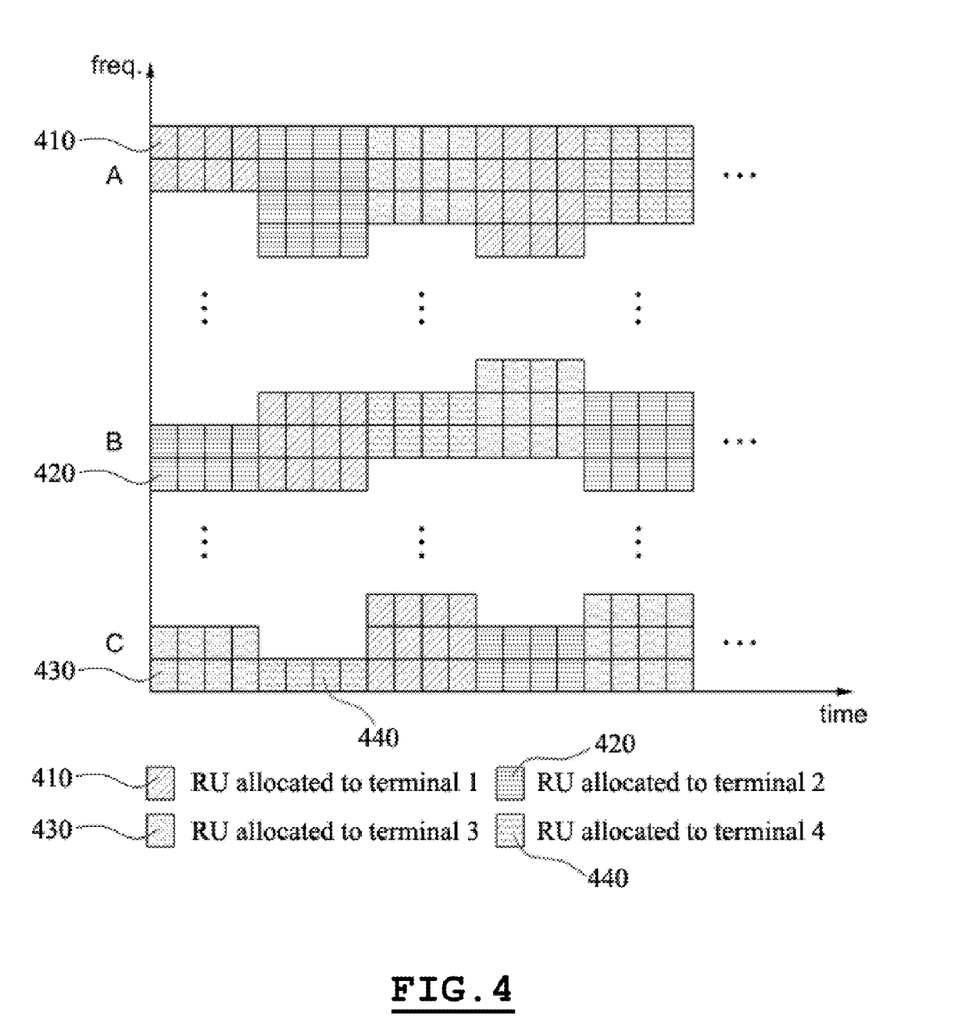
FIG. 4 illustrates an example of transmitting data through frequency-selective scheduling and frequency hopping according to an exemplary embodiment of the present invention.

FIG. 4 illustrates an example of transmitting data through frequency-selective scheduling and frequency hopping according to an exemplary embodiment of the present invention.

As illustrated in FIG. 4, one resource unit (RU) designated by a block includes one or multiple sub-carriers in the frequency domain, and includes one or multiple symbols in the time domain. The block filled with deviant crease lines (410) represents an RU allocated to a terminal 1, the block filled with horizontal lines (420) represents an RU allocated to a terminal 2, the block filled with dotted lines (430) represents an RU allocated to a terminal 3, and the block filled with wavy lines (440) represents an RU allocated to a terminal 4.

Assuming that the best frequency band for terminal 1 is frequency band A, terminal 1 may also have good channel characteristics in frequency band B and C. Here, frequency bands A, B, and C may be selected as frequency bands for terminal 1 by frequency-selective scheduling. Accordingly, the resource allocation apparatus in an OFDMA wireless communication system according to embodiments of the present invention may first allocate frequency band A to terminal 1, and then may select frequency band B or C as the second frequency band and allocate it to terminal 1 through frequency hopping at certain time periods.

In addition, assuming that the best frequency band for terminal 2 is frequency band B, terminal 2 may also have good channel characteristics in frequency band A and C. Accordingly, the resource allocation apparatus in an OFDMA wireless communication system according to embodiments of the present invention may first allocate frequency band B to terminal 2, and then may select frequency band A or C as the second frequency band and allocate it to terminal 2 through frequency hopping at certain time periods.

Although only a description of terminals 1 and 2 has been given above, the resource allocation apparatus in an OFDMA wireless communication system according to embodiments of the present invention operates in the same manner for terminals 3 and 4 as for terminals 1 and 2. That is, as illustrated in FIG. 4, the resource allocation apparatus first allocates the best frequency band to terminal 3 and terminal 4, and then allocates a different frequency band with good channel characteristics to terminal 3 and 4 through frequency hopping at certain time periods. Additionally, where two terminals share a single best frequency band, such as if terminal 1 and terminal 3 each have a best frequency band of frequency band A, the resource allocation apparatus in an OFDMA wireless communication system may allocate frequency band A only to terminal 1 according to an importance factor or other priority determination, and a different frequency band with best or good channel characteristics and that is available for allocation may be allocated to terminal 3.

In this way, the resource allocation apparatus in an OFDMA wireless communication system according to embodiments of the present invention can not only obtain frequency-selective scheduling gain by continuing to sequentially allocate frequency bands with good channel characteristics to each terminal, but can also obtain frequency diversity gain by frequency hopping for randomizing interference with a different terminal in a neighboring cell, which uses the same frequency band.

Figure 5:
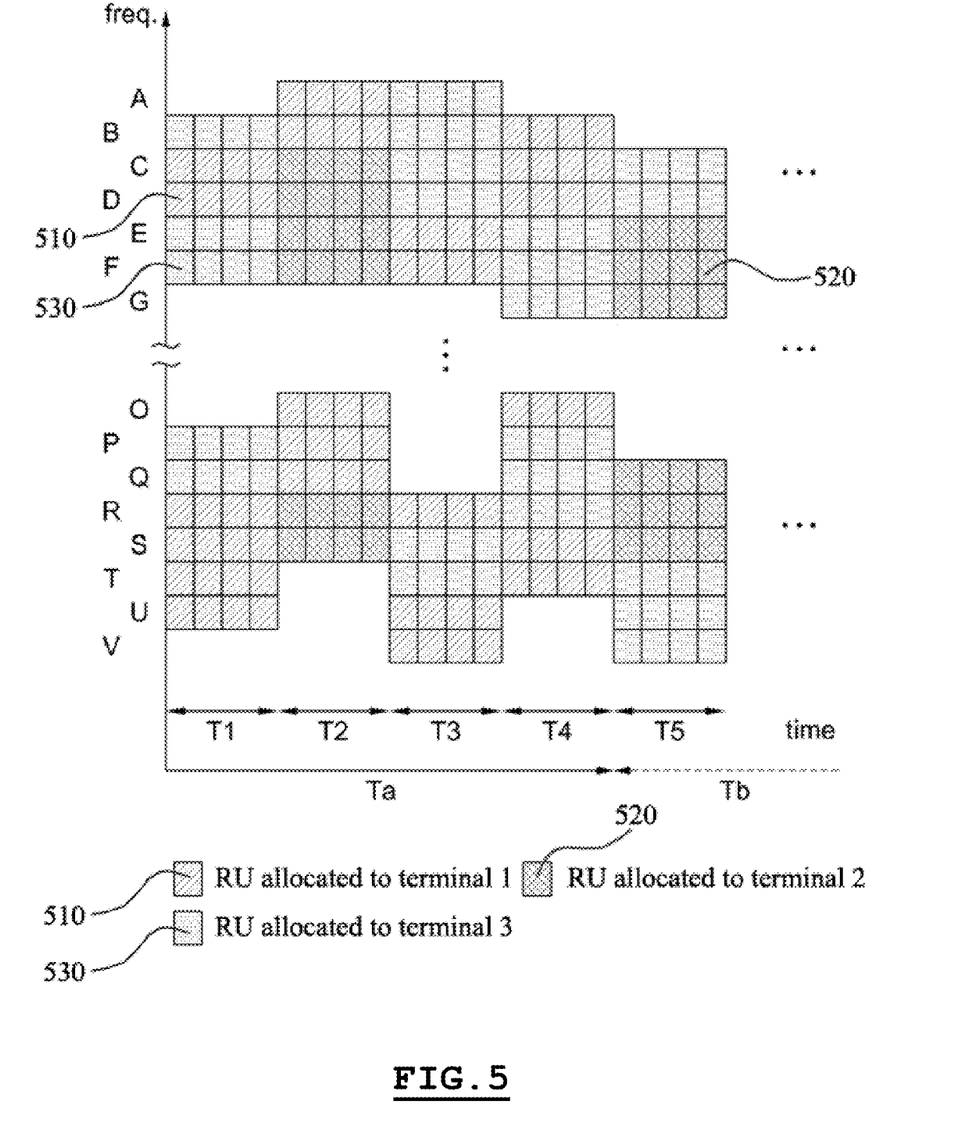
FIG. 5 illustrates an example of allocating a resource through frequency-selective scheduling and frequency hopping in accordance with an exemplary embodiment of the present invention.

FIG. 5 illustrates an example of allocating a resource through frequency-selective scheduling and frequency hopping according to an exemplary embodiment of the present invention.

As illustrated in FIG. 5, one resource unit (RU) designated by a block includes one or multiple sub-carriers in the frequency domain, and includes one or multiple symbols in the time domain. The block filled with deviant crease lines (510) represents an RU allocated to terminal 1, the block filled with x-shaped lines (520) represents an RU allocated to terminal 2, and the block filled with dotted lines (530) represents an RU allocated to terminal 3.

Also, Ta and Tb on the time axis represent intervals in which resource allocation by frequency-selective scheduling and frequency hopping occurs. Each of these intervals includes one or more periods at which resource allocation by frequency-selective scheduling occurs, and one or more periods at which resource allocation by frequency hopping occurs. For example, interval Ta is divided into periods T1, T2, T3, and T4. Similarly, interval Tb is divided into period T5 and so on.

Figure 9:
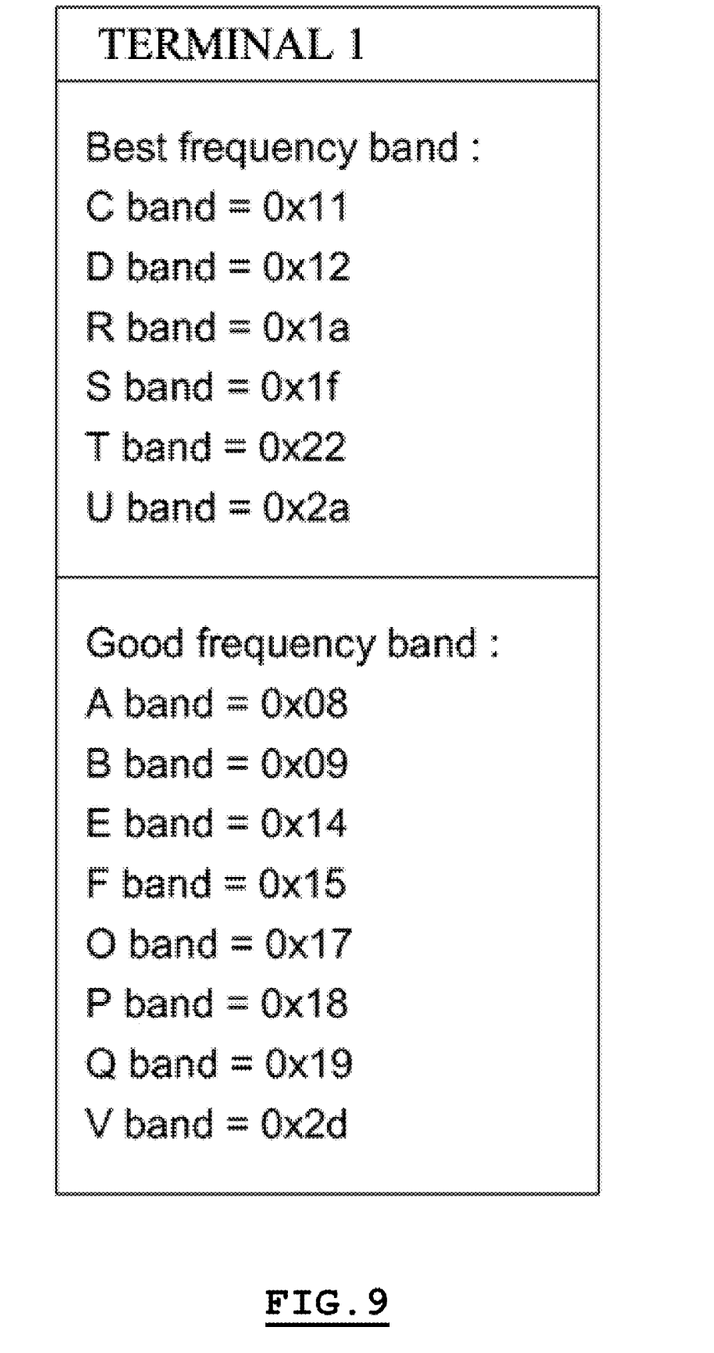
FIG. 9 illustrates a list of frequency bands created in accordance with an exemplary embodiment of the present invention.

The resource allocation apparatus according to embodiments of the present invention makes a list, as illustrated in FIG. 9, in each of intervals Ta, Tb, etc. . . . , and allocates a is resource by performing frequency-selective scheduling at a first period and performing frequency hopping at a second period of each interval. FIG. 9 illustrates a list of frequency bands created in accordance with an exemplary embodiment of the present invention.

As illustrated in FIG. 9, for example, it is assumed that frequency bands C, D, R, S, T, and U are registered as the best frequency bands for terminal 1 in the list, and frequency bands A, B, E, F, O, P, Q, and V are registered as good frequency bands for terminal 1 in the list. In this case, the resource allocation apparatus allocates a resource with reference to the list in such a manner that the best frequency bands (i.e. one or more of frequency bands C, D, R, S, T, and U) are allocated to terminal 1 at period T1 of interval Ta, and frequency bands A, B, O, P, and Q randomly selected from among good frequency bands A, B, E, F, O, P, Q, and V are allocated to terminal 1 at period T2 of interval Ta. At periods T3 and T4 of interval Ta, the resource allocation apparatus allocates a resource in the same manner as period T2, that is, frequency bands randomly selected from among good frequency bands A, B, E, F, O, P, Q, and V are allocated to terminal 1.

Also, in interval Tb, the resource allocation apparatus allocates a resource by frequency-selective scheduling and frequency hopping, in the same manner as interval Ta.

Although only a description of terminal 1 has been given above, the resource allocation apparatus according to embodiments of the present invention operates in the same manner for terminals 2, 3, 4, and so on as for terminal 1. That is, as illustrated in FIG. 5, the resource allocation apparatus allocates the best frequency bands to each terminal (terminal 2, 3, 4, . . . ) at period T1 by using the created list, and then allocates good frequency bands (including the best frequency bands) to each terminal (terminal 2, 3, 4, . . . ) at periods T2, T3, and T4 through frequency hopping using the list. The resource allocation apparatus may then create a is new list for terminals 1, 2, 3, and 4 at the start of interval Tb.

Although the above description suggests that frequency bands randomly selected from among good frequency bands A, B, E, F, O, P, Q, and V are allocated at periods T2 to T4, resource allocation may also be performed in such a manner that frequency bands randomly selected from among the good frequency bands and the best frequency bands (except those allocated at period T1) are allocated at periods T2 to T4.

The above description suggests that one or more of the best frequency bands are selectively allocated at the first period of each of intervals Ta, Tb, . . . , that is, periods T1, T5, . . . , and good frequency bands or frequency bands randomly selected from among the good frequency bands and the best frequency bands (except those allocated at the first period) are allocated at the remaining periods. However, when the list of FIG. 9 is created based on channel characteristics, resource allocation may also be performed in such a manner that one or more of the best frequency bands are allocated at any one period or any two or more periods of intervals Ta, Tb, etc., and good frequency bands or frequency bands randomly selected from among the good frequency bands and the best frequency bands (except those allocated at the first period) are allocated at the remaining periods.

Thus, frequency-selective scheduling can be performed in intervals Ta, Tb, etc., where frequency-selective resource allocation is made based on channel characteristics in intervals Ta, Tb, etc., and it can be said that frequency hopping is performed at sub-divided periods of intervals Ta, Tb, etc., since one or more of the best frequency bands are selectively allocated at some of the sub-divided periods of intervals Ta, Tb, etc., and good frequency bands or frequency bands randomly selected from among the good frequency bands and the best frequency bands (except those allocated at the first period) are allocated at the remaining periods.

In another aspect of this embodiment, it can be said that frequency-selective scheduling is performed since the best frequency bands are allocated at some of the sub-divided periods of intervals Ta, Tb, etc., and it can be said that frequency hopping is performed since good frequency bands or frequency bands randomly selected from among the good frequency bands and the best frequency bands (except those allocated at the first period) are allocated at the remaining periods.

In this way, the resource allocation apparatus can obtain frequency-selective scheduling gain by periodically allocating frequency bands with good channel characteristics to each terminal, and can also obtain frequency diversity gain by frequency hopping for randomizing interference with a different terminal in a neighboring cell, which uses the same frequency band.

Figure 6:
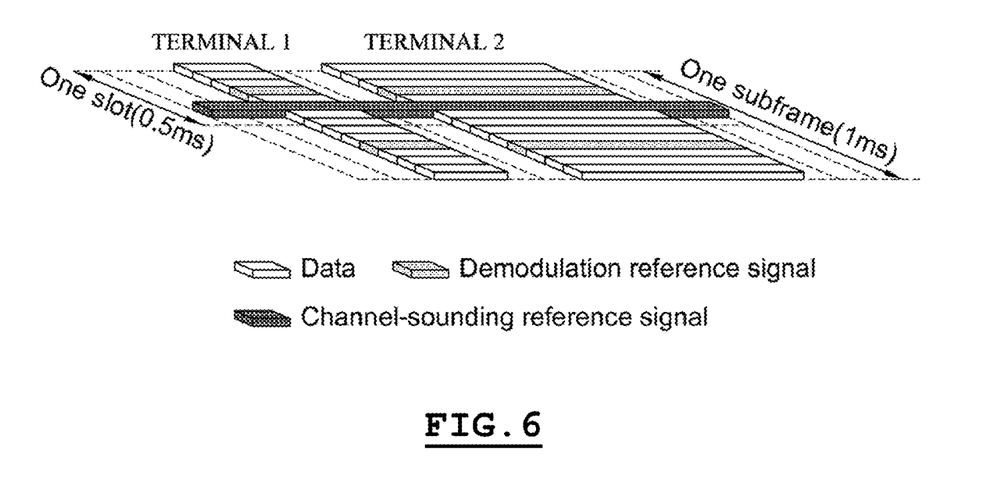
FIG. 6 illustrates a structure of a channel-sounding reference signal (CSRS) employed in an exemplary embodiment of the present invention.

FIG. 6 illustrates a structure of a CSRS employed in an exemplary embodiment of the present invention.

As illustrated in FIG. 6, one sub-frame includes two slots. One slot includes data, a demodulation reference signal (DRS), and a channel-sounding reference signal (CSRS).

The CSRS is a reference signal for use in determining the characteristics of a channel between a terminal and a base station, and is transmitted from the terminal to the base station. The CSRS is transmitted over all frequency bands, including frequency bands allocated to the terminal.

Therefore, the terminal transmits a CSRS to a base station, and the base station receives the CSRS from the terminal to determine the characteristics of a channel between the terminal and the base station, based on the received CSRS.

Figure 7:
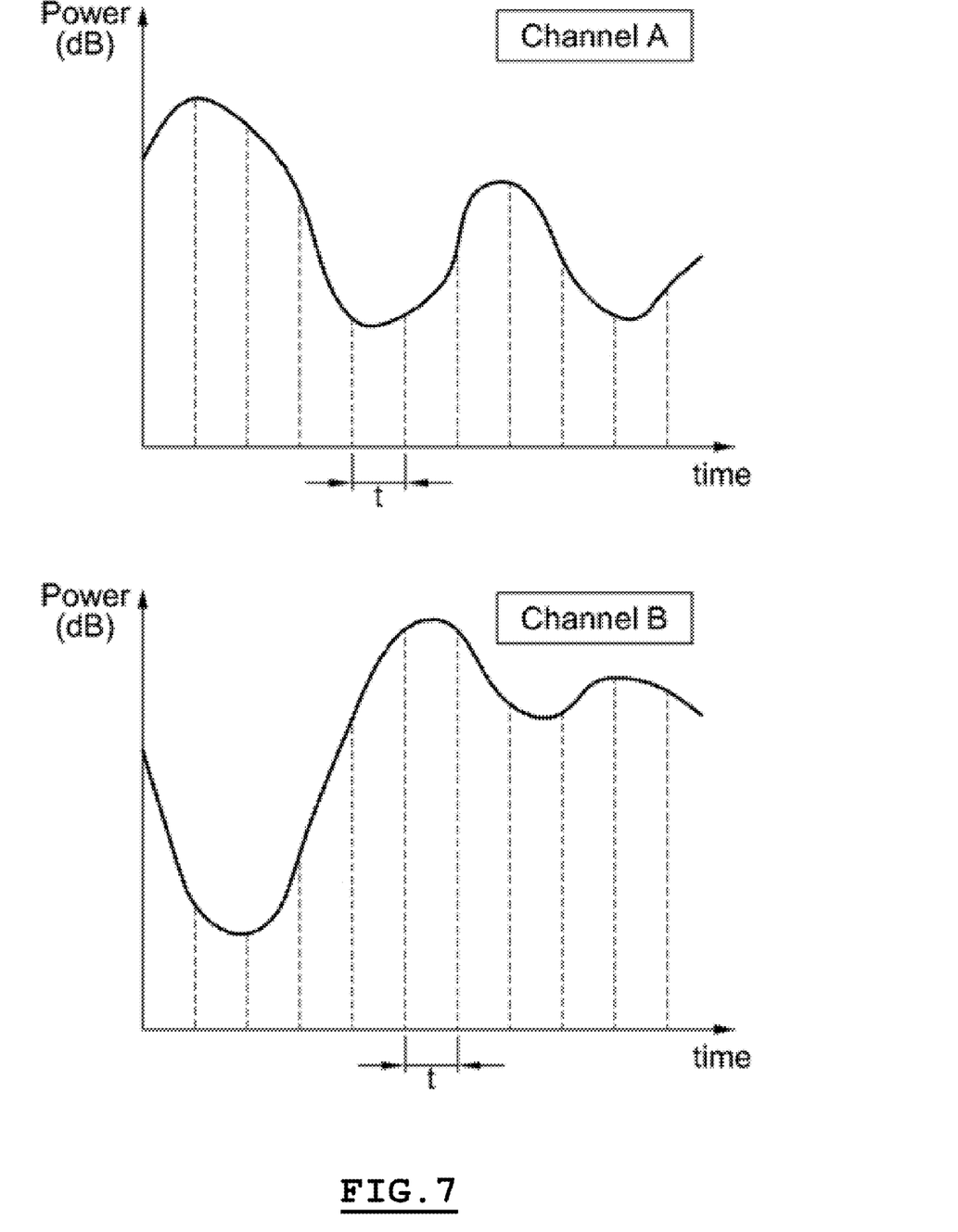
FIG. 7 and FIG. 8 are charts illustrating an example of measuring the correlation of each sub-channel in accordance with an exemplary embodiment of the present invention.
Figure 8:
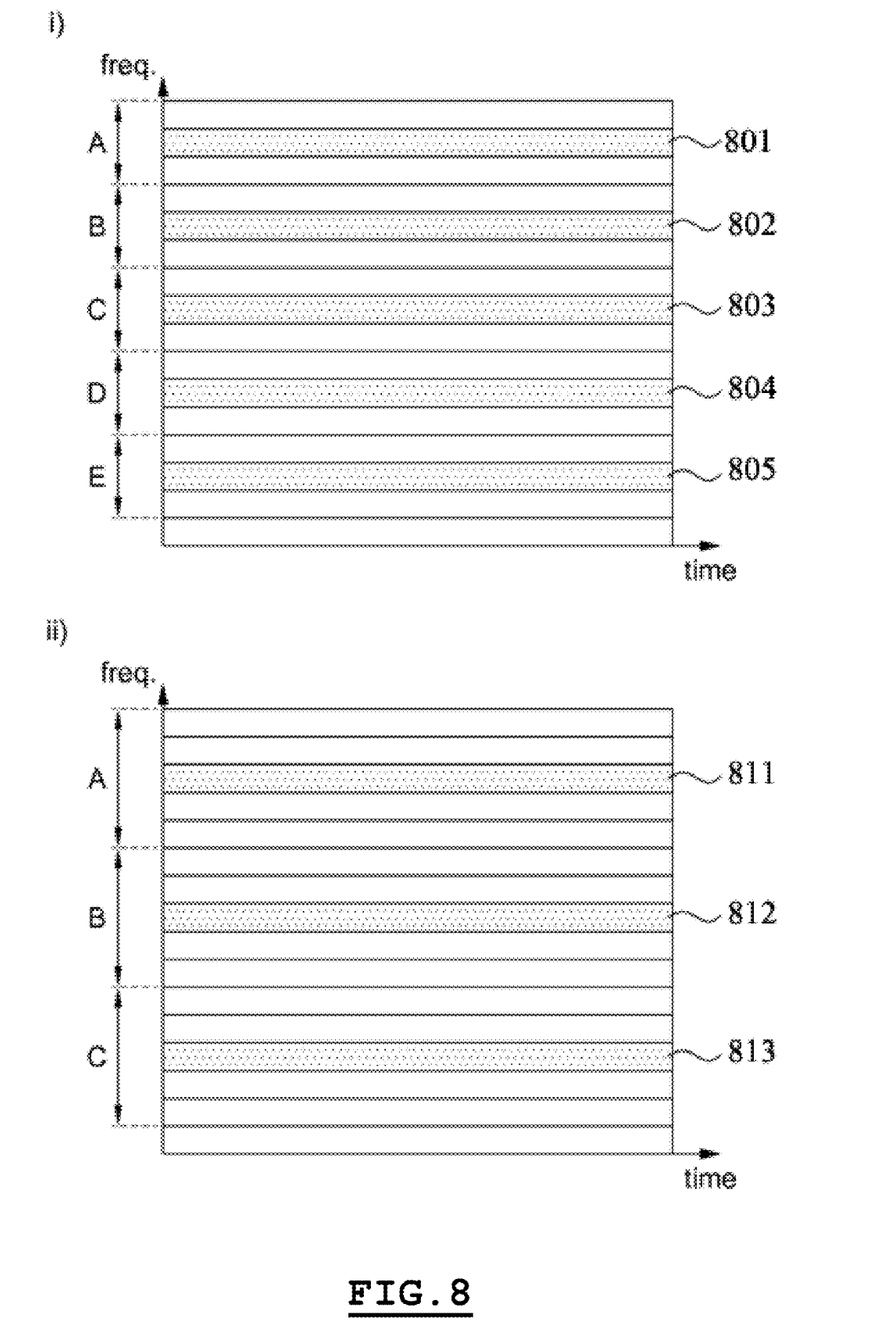

FIG. 7 and FIG. 8 are charts illustrating an example of measuring the correlation is of each sub-channel according to an exemplary embodiment of the present invention.

First, as illustrated in FIG. 7, the resource allocation apparatus in an OFDMA wireless communication system according to embodiments of the present invention divides channel A or B into regular time intervals (t), calculates the characteristic values of the channel corresponding to the divided time intervals (t), and measures the correlation of channel A or B by using the calculated characteristic values.

Alternatively, in consideration of the moving speed of a terminal 110, the resource allocation apparatus in an OFDMA wireless communication system according to embodiments of the present invention may divide a frequency band into five frequency bands (A, B, C, D, and E) (see i of FIG. 8) or three frequency bands (A, B, and C) (see ii of FIG. 8), calculates characteristic values of channels corresponding to the central frequencies (801, 802, 803, 804, and 805) of the respective five divided frequency bands or the central frequencies (811, 812, or 813) of the respective three divided frequency bands, and measures the correlation by using the calculated characteristic values.

Figure 10:
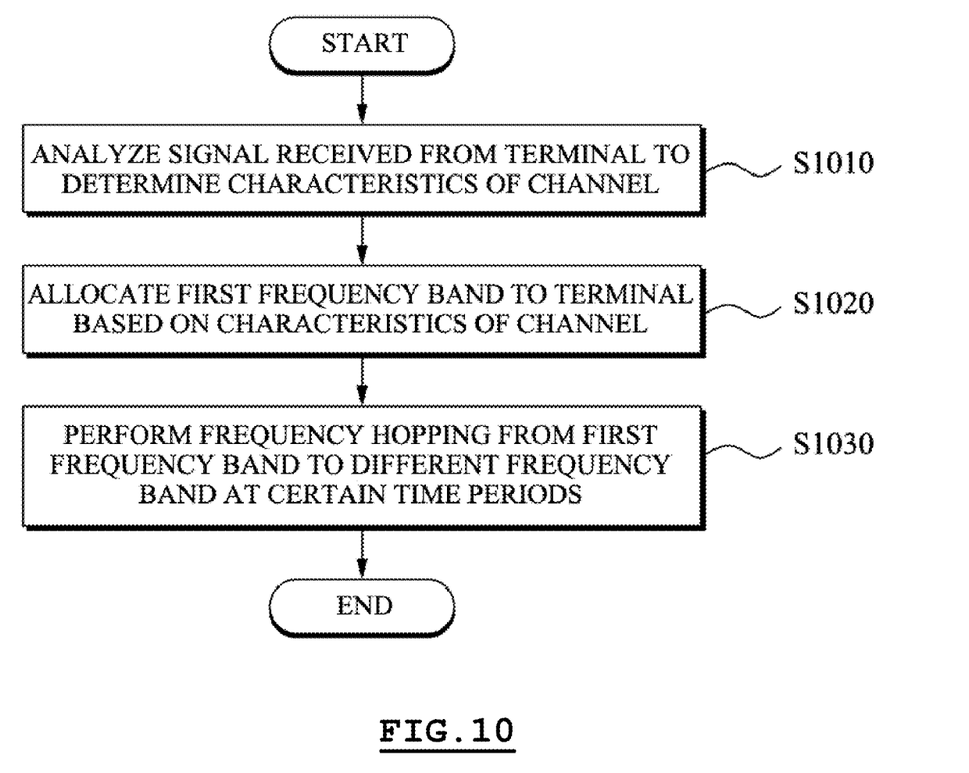
FIG. 10 is a flowchart illustrating a resource allocation method in an OFDMA wireless communication system in accordance with an exemplary embodiment of the present invention.

FIG. 10 is a flowchart illustrating a resource allocation method in an OFDMA wireless communication system according to an exemplary embodiment of the present invention. The resource allocation method in an OFDMA wireless communication system according to this embodiment of the present invention may be implemented by a resource allocation apparatus, which in turn may be implemented in the base station 120 of FIG. 1.

Referring to FIG. 1 and FIG. 10, in step S1010, the resource allocation apparatus analyzes a signal received from the terminal 110 over a channel between the terminal 110 and the base station 120 to determine the characteristics of the channel. Here, the signal may include a CSRS.

As mentioned above, the CSRS is a reference signal that is transmitted from the terminal 110 over all frequency bands, including frequency bands allocated to the terminal 110, to inform the base station 120 of the characteristics of a channel between the terminal 110 and the base station 120.

Next, in step S1020, the resource allocation apparatus allocates a first frequency band to the terminal 110 based on the determined characteristics of the channel. That is, the resource allocation apparatus selects the best frequency band suitable for the determined characteristics of the channel as a first frequency band, and allocates the selected first frequency band to the terminal 110. With regard to this, the resource allocation apparatus may select the first frequency band by using frequency-selective scheduling, and allocate the selected first frequency band to the terminal 110.

In this way, the resource allocation apparatus can allocate a best frequency band, which is best for the determined characteristics of the channel, as the first frequency band to the terminal 110, thereby obtaining frequency-selective scheduling gain.

Next, in step S1030, the resource allocation apparatus performs frequency hopping from the allocated first frequency band to a different frequency band at certain time periods. For example, it is assumed that a frequency band, which is best for the determined characteristics of the channel and is allocated to the terminal 110, is frequency band A, and frequency bands with good channel characteristics (but less than frequency band A) are frequency bands B and C. In this case, the resource allocation apparatus allocates frequency band B or C, instead of frequency band A, to the terminal 110 through frequency hopping when a certain period of time elapses after frequency band A is allocated to the terminal 110.

With regard to this, the resource allocation apparatus may perform frequency is hopping in consideration of the correlation of each frequency band. That is, the resource allocation apparatus may select a frequency band having the lowest channel correlation property with the first frequency band, and perform frequency hopping to the selected frequency band.

Alternatively, the resource allocation apparatus may perform frequency hopping in consideration of both the determined characteristics of the channel and the correlation of each frequency band. That is, the resource allocation apparatus may select a second frequency band, whose correlation with the first frequency band is lower than a predetermined criterion, from among frequency bands selected as having good channel characteristics through frequency-selective scheduling, and perform frequency hopping to the second frequency band.

Here, the predetermined criterion is a criterion for determining whether the correlation between channels is high or low. If any channel has a correlation lower than the criterion, then it can be determined that the path environment of the channel is different from that of another channel. Also, the good channel characteristics refer to a case where the determined characteristics of the channel are equal to or greater than an appropriate reference value.

In this way, the resource allocation apparatus performs frequency hopping in consideration of the characteristics of a channel or the correlation of each frequency band, so that frequency diversity gain can be obtained by frequency hopping for randomizing interference to a terminal in a neighboring cell, which uses the same frequency band.

In order to measure the correlation of each frequency band, the resource allocation apparatus divides each sub-channel of the channel into regular time intervals, calculates the characteristic values of the channel corresponding to the divided time intervals, and measures the correlation of each sub-channel by using the calculated characteristic values. Accordingly, the resource allocation apparatus can perform frequency hopping based on the measured correlation is of each sub-channel.

Alternatively, the resource allocation apparatus may measure the correlation of each frequency band in consideration of the moving speed of the terminal 110. That is, to measure the correlation of each frequency band, the resource allocation apparatus may divide a frequency band into multiple frequency bands, and measure the correlation for channels corresponding to the central frequencies of the respective divided frequency bands. Accordingly, the resource allocation apparatus can perform frequency hopping based on the measured correlation for channels corresponding to the central frequencies of the respective divided frequency bands.

Figure 11:
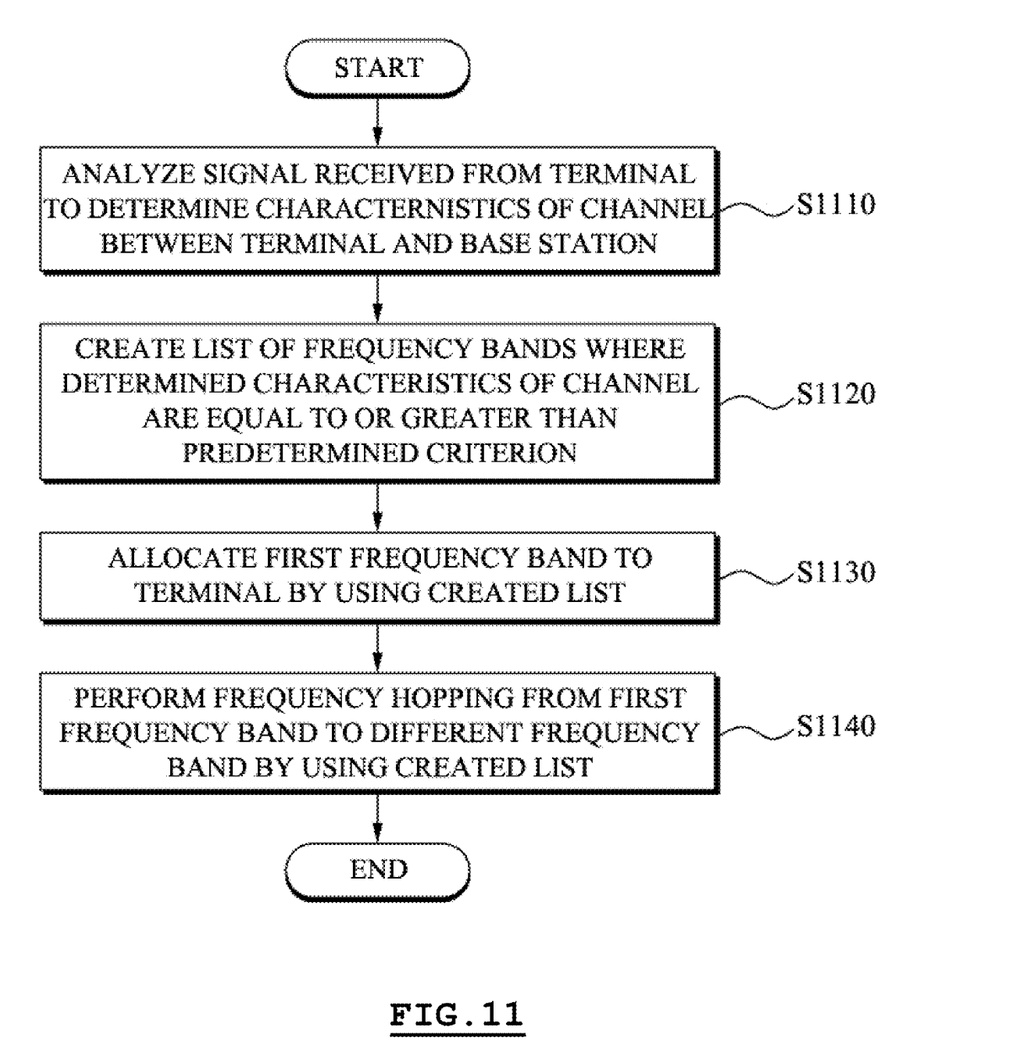
FIG. 11 is a flowchart illustrating a resource allocation method in an OFDMA wireless communication system according to an exemplary embodiment of the present invention.

FIG. 11 is a flowchart illustrating a resource allocation method in an OFDMA wireless communication system according to an exemplary embodiment of the present invention. The resource allocation method in an OFDMA wireless communication system according to this embodiment of the present invention may be implemented by a resource allocation apparatus, which in turn may be implemented in the base station 120 of FIG. 1.

Referring to FIG. 1 and FIG. 11, first of all, the resource allocation apparatus receives a signal from the terminal 110 via the communication network 130. More specially, the resource allocation apparatus receives a signal including a CSRS from the terminal 110 over a channel between the terminal 110 and the base station 120.

As mentioned above, the CSRS included in the received signal is a reference signal that is transmitted from the terminal 110 over all frequency bands, including frequency bands allocated to the terminal 110, to inform the base station 120 of the characteristics of a channel between the terminal 110 and the base station 120.

In step S1110, the resource allocation apparatus analyzes the CSRS to recognize is the characteristics of the channel between the terminal 110 and the base station 120. That is, the resource allocation apparatus can identify the best frequency bands, good frequency bands, and bad frequency bands in the channel between the terminal 110 and the base station 120 by analyzing the CSRS included in the received signal.

Next, in step S1120, the resource allocation apparatus makes a list of frequency bands where the recognized channel characteristics are equal to or greater than a predetermined reference value. That is, the resource allocation apparatus makes a list of the best frequency bands and good frequency bands by using the recognized channel characteristics, as illustrated in FIG. 9.

More specially, the resource allocation apparatus performs frequency-selective scheduling to select frequency bands where the recognized channel characteristics are equal to or greater than a predetermined reference value (i.e. frequency bands including the best frequency bands and good frequency bands), and makes a list of the selected frequency bands. Here, the reference value may be set in consideration of the moving speed of the terminal 110 or the environment around the terminal 110.

Next, in step S1130, the resource allocation apparatus allocates a first frequency band to the terminal 110 by using the created list. That is, the resource allocation apparatus selects the best frequency band suitable for the recognized channel characteristics as a first frequency band from among the frequency bands within the created list, and allocates it to the terminal 110.

With regard to this, the resource allocation apparatus may select the first frequency band from the list and then allocate it to the terminal 110 at a selected first period. Here, the first period corresponds to a period at which frequency-selective scheduling is performed, and a duration of which may be appropriately determined by the base station 120 in correspondence with the moving speed of the terminal 110 or the environment around the terminal 110.

Next, in step S1140, the resource allocation apparatus performs frequency hopping from the first frequency band to a second frequency band by using the created list. With regard to this, the resource allocation apparatus may randomly select a second frequency band different from the first frequency band and then allocate it to the terminal 110 at a selected second period.

Here, the second period corresponds to a period at which frequency hopping is performed, and similar to the first period, may be appropriately determined by the base station 120 in correspondence with the moving speed of the terminal 110 or the environment around the terminal 110. With regard to this, the second period may be set shorter than the first period. In other words, the first period may be set longer than the second period. This is because a resource allocation scheme using frequency-selective scheduling exchanges appropriate messages between the terminal 110 and the base station 120, and this may occupy time.

In this way, the resource allocation apparatus randomly allocates a resource through frequency hopping using the list at the second period, so that frequency diversity gain can be obtained.

As another embodiment of the present invention, the resource allocation apparatus may perform frequency hopping in consideration of the correlation of each frequency band. That is, the resource allocation apparatus may select a frequency band having a lower correlation property with the first frequency band, and perform frequency hopping to the selected frequency band.

Alternatively, the resource allocation apparatus may perform frequency hopping in consideration of both the recognized characteristics of the channel and the correlation of each frequency band. That is, the frequency hopping unit 340 may select a second frequency band which has good channel characteristics and whose correlation with the first frequency band is lower than a predetermined criterion, and performs frequency hopping to the selected second frequency band.

Here, the predetermined criterion is a criterion for determining whether the correlation between channels is high or low. If any channel has a correlation lower than the criterion, then it can be determined that the path environment of the channel is different from that of another channel, that is, the channel has a path independent of that of another channel.

In this way, the resource allocation apparatus performs frequency hopping in consideration of the characteristics of a channel or the correlation of each frequency band, so that frequency diversity gain can be obtained by frequency hopping for randomizing interference to a terminal 110 in a neighboring cell, which uses the same frequency band. That is, when a frequency band allocated to a terminal 110 in a corresponding cell is the same as that allocated to a terminal in a neighboring cell, the resource allocation apparatus can provide an environment in which the terminal 110 in the corresponding cell is prevented from being continually interfered by the terminal in the neighboring cell at certain time periods.

The correlation may be measured as follows:
The resource allocation apparatus divides each sub-channel of the channel between the terminal 110 and the base station 120 into regular time intervals, calculates the characteristic values of the channel corresponding to the divided time intervals, and measures the correlation of each sub-channel by using the calculated characteristic values. Accordingly, the is resource allocation apparatus can perform frequency hopping based on the measured correlation of each sub-channel.

Alternatively, in consideration of the moving speed of the terminal 110, the resource allocation apparatus may divide a frequency band into multiple frequency bands, and measure the correlation for channels corresponding to the central frequencies of the respective divided frequency bands. Accordingly, the resource allocation apparatus can perform frequency hopping based on the measured correlation for channels corresponding to the central frequencies of the respective divided frequency bands.

Embodiments of the present invention include a computer-readable recording medium including program instructions for executing various operations by a computer. The computer-readable recording medium may include, alone or in combination, program instructions, local data files, local data structures, and the like. The computer-readable recording medium may be any one of those designed and configured specially for the present invention or those known to and readily available to persons skilled in the field of computer software. Examples of the computer-readable recording medium include, but not limited to, a magnetic medium, such as a hard disk, a floppy disk, and a magnetic tape; an optical recording medium, such as a CD-ROM (compact disk-read only memory) and a DVD (digital video/versatile disk); an magneto-optical medium, such as a floptical disk; and a hardware device configured specially to store and execute program instructions, such as a ROM (read only memory), a RAM (random access memory), and a flash memory. Examples of the program instructions include, but not limited to, machine language codes as constructed by a complier and high-level language codes executable by a computer using an interpreter.

It will be apparent to those skilled in the art that various modifications and is variation can be made in the present invention without departing from the spirit or scope of the invention. Thus, it is intended that the present invention cover the modifications and variations of this invention provided they come within the scope of the appended claims and their equivalents.

What is claimed is:

1. An apparatus to allocate a resource in a wireless communication system using an orthogonal frequency division multiple access (OFDMA) scheme, the apparatus comprising:
    an analysis unit to analyze a signal received from a terminal over a channel to determine characteristics of the channel;
    an allocation unit to allocate a first frequency band to the terminal based on the determined characteristics of the channel; and
    a frequency hopping unit to perform frequency hopping from the first frequency band to a second frequency band after a first time period,
    wherein the frequency hopping unit selects the second frequency band having a correlation with the first frequency band that is lower than a predetermined criterion, the second frequency band selected from among frequency bands where the determined characteristics of the channel are equal to or greater than a reference value.

2. The apparatus as claimed in claim 1, further comprising a measurement unit to divide each sub-channel of the channel into regular time intervals, to calculate characteristic values of the channel corresponding to the divided time intervals, and to measure a correlation of each sub-channel by using the calculated characteristic values,
    wherein the frequency hopping unit performs the frequency hopping based on the measured correlation of each sub-channel.

3. The apparatus as claimed in claim 1, further comprising a measurement unit to divide a frequency band of each sub-channel of the channel into a plurality of frequency bands in consideration of a moving speed of the terminal, to calculate characteristic values of channels corresponding to central frequencies of the respective divided frequency bands, and to measure a correlation of each sub-channel by using the calculated characteristic values,
    wherein the frequency hopping unit performs the frequency hopping based on the measured correlation of each sub-channel.

4. The apparatus as claimed in claim 1, wherein the allocation unit selects the first frequency band by using frequency-selective scheduling, and allocates the first frequency band to the terminal.

5. The apparatus as claimed in claim 1, wherein the signal includes a channel-sounding reference signal (CSRS).

6. The apparatus as claimed in claim 1, further comprising a list creation unit to create a list of frequency bands where the determined characteristics of the channel satisfy a predetermined criterion,
    wherein the allocation unit allocates the first frequency band to the terminal by using the list, and the frequency hopping unit performs the frequency hopping from the first frequency band to the second frequency band according to the list.

7. The apparatus as claimed in claim 6, wherein the criterion is predetermined in consideration of a moving speed of the terminal or an environment around the terminal.

8. The apparatus as claimed in claim 6, wherein the list creation unit creates the list by performing frequency-selective scheduling.

9. The apparatus as claimed in claim 6, wherein the frequency hopping unit performs the frequency hopping from the first frequency band to the second frequency band, the second frequency band being randomly selected from among frequency bands that are different from the first frequency band and are included in the list.

10. The apparatus as claimed in claim 6, wherein the allocation unit allocates the first frequency band for the first time period, and the frequency hopping unit performs the frequency hopping to the second frequency band for a second time period that is shorter than the first time period.

11. A method for allocating a resource in a wireless communication system using an orthogonal frequency division multiple access (OFDMA) scheme, the method comprising:
    analyzing a signal received from a terminal over a channel to determine characteristics of the channel;
    allocating a first frequency band to the terminal based on the determined characteristics of the channel; and
    performing frequency hopping from the first frequency band to a second frequency band after a first time period,
    wherein performing the frequency hopping comprises:
    selecting the second frequency band having a correlation with the first frequency band that is lower than a predetermined criterion, the second frequency band selected from among frequency bands where the determined characteristics of the channel are equal to or greater than a reference value.

12. The method as claimed in claim 11, further comprising:

dividing each sub-channel of the channel into regular time intervals;

calculating characteristic values of the channel corresponding to the divided time intervals; and measuring a correlation of each sub-channel by using the calculated characteristic values, wherein performing the frequency hopping comprises performing the frequency hopping based on the measured correlation of each sub-channel.

13. The method as claimed in claim 11, further comprising:

dividing a frequency band of each sub-channel of the channel into a plurality of frequency bands in consideration of a moving speed of the terminal;

calculating characteristic values of channels corresponding to central frequencies of the respective divided frequency bands; and measuring a correlation of each sub-channel by using the calculated characteristic values, wherein performing the frequency hopping comprises performing the frequency hopping based on the measured correlation of each sub-channel.

14. The method as claimed in claim 11, wherein allocating the first frequency band comprises:

selecting the first frequency band by using frequency-selective scheduling; and allocating the selected first frequency band to the terminal.

15. The method as claimed in claim 11, wherein the signal includes a channel-sounding reference signal (CSRS).

16. The method as claimed in claim 11, further comprising:

creating a list of frequency bands where the determined characteristics of the channel satisfy a predetermined criterion, wherein allocating the first frequency band comprises allocating the first frequency band to the terminal by using the list, and performing the frequency hopping comprises performing the frequency hopping from the first frequency band to the second frequency band according to the list.

17. The method as claimed in claim 16, wherein the criterion is predetermined in consideration of a moving speed of the terminal or an environment around the terminal.

18. The method as claimed in claim 16, wherein creating the list comprises creating the list by performing frequency-selective scheduling.

19. The method as claimed in claim 16, wherein performing the frequency hopping comprises performing the frequency hopping from the first frequency band to the second frequency band, the second frequency band being randomly selected from among frequency bands that are different from the first frequency band and are included in the list.

20. The method as claimed in claim 16, wherein allocating the first frequency band comprises allocating the first frequency band for the first time period, and performing the frequency hopping comprises performing the frequency hopping to the second frequency band for a second time period that is shorter than the first period.

21. A non-transitory computer-readable recording medium encoded with computer executable instructions for executing the method as claimed in claim 11.

* * * * *